Aug. 8, 1950     R. F. SHARROW     2,518,192

ELECTRIC COIL LEAD-IN ANCHOR

Filed Dec. 19, 1945

Inventor:
Robert F. Sharrow,
by *Prowell S. Mack*
His Attorney.

Patented Aug. 8, 1950

2,518,192

UNITED STATES PATENT OFFICE 2,518,192

ELECTRIC COIL LEAD-IN ANCHOR

Robert F. Sharrow, Fort Wayne, Ind., assignor to General Electric Company, a corporation of New York Application December 19, 1945, Serial No. 636,024

2 Claims. (Cl. 174—138)

My invention relates to an electrical coil construction and particularly to such a coil which is formed with a lead connected thereto and provided with a seal for protecting the connection of the lead to the coil conductor.

An object of my invention is to provide an improved electrical coil construction.

Another object of my invention is to provide a sealing member where leads enter the coil.

A further object of my invention is to provide an improved anchor for the lead to the coil.

A still further object of my invention is to provide an improved coil with a separate lead and a seal for protecting the connection of the lead to the coil conductor.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
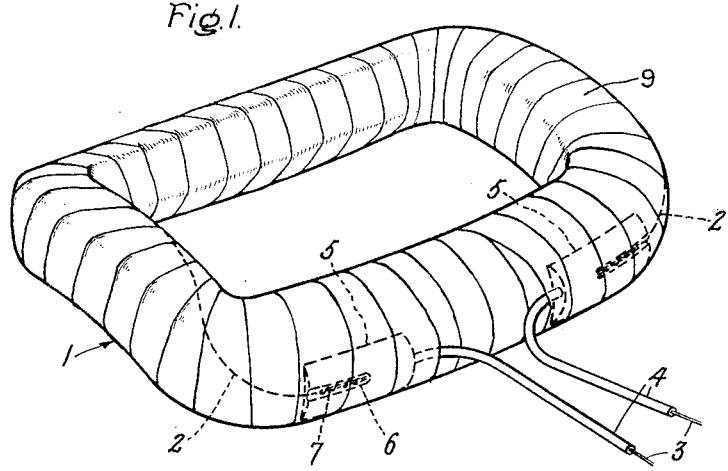
Figure 2:
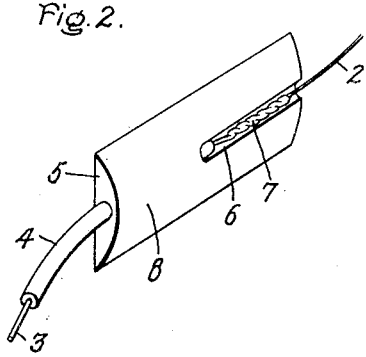
Figure 3:

In the drawing, Fig. 1 is a perspective view of an electrical coil provided with an embodiment of my invention; Fig. 2 is a perspective view of my improved seal construction showing a part of the lead and a part of the coil conductor arranged in the seal; and Fig. 3 is a longitudinal sectional view through the seal shown in Fig. 2 taken along the longitudinal center line thereof.

Referring to the drawing, I have shown an embodiment of my improved electrical coil construction provided with an improved seal in which a coil 1, which may be used as an exciting winding for a pole of a dynamoelectric machine, is formed of a relatively small electrical conductor 2 with thin insulation thereon and adapted to be electrically connected to an energizing source through leads electrically connected to each end of the coil and each comprising an electrical conductor 3 of larger size with heavier insulation 4 thereon than the coil conductor 2. In order to protect the coil winding and the connection of the lead to the coil conductor, I provide an oil resistant resilient insulating material seal member 5 for sealing the lead as it enters the coil. This seal is formed with a longitudinally extending opening 6 therethrough which is substantially the size of the insulated lead, and the end of the lead which is connected to the coil extends into the opening 6, such that the seal fits snugly around the lead, and the electrical connection 7 of the lead to the coil conductor 2 may be arranged in the opening 6 intermediate the ends of the seal member 5. The outer surface 8 of the seal member is curved transversely thereof and is formed with a longitudinal taper through a portion thereof which is thinner towards the coil conductor ends, as is shown in the sectional view in Fig. 3. These seals 5 are secured in position by an insulating tape 9 which is securely wrapped around each of the seals 5, as shown in Fig. 1, to hold these seals on the outer side of the coil and to provide a smooth surface to the coil with the tape 9 wrapped so that it extends over at least each end of the seal for securely attaching the seal to the coil.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A sealing and anchor member for the connection of an insulated lead to a coil conductor, the outer surface of said member being convex in the transverse direction and having a longitudinal taper and the inner surface being substantially flat, a longitudinally extending opening through said member, said opening at one end of said member being shaped to fit snugly around said insulated lead, said tapered outer surface intersecting said longitudinally extending opening at an acute angle to form a groove, said groove extending to the other end of said member and being adapted to receive the connection of said lead and said conductor.

2. A sealing and anchor member for the connection of an insulated lead to a coil conductor, the outer surface of said member being convex in the transverse direction and having a longitudinally tapered part and the inner surface being substantially flat, a longitudinally extending cylindrical opening through said member, said opening at one end of said member being adapted to receive and engage said insulated lead, the tapered part of said outer surface intersecting said longitudinally extending opening at an acute angle to form a groove, said groove extending to the other end of said member and being adapted to receive the connection of the lead and the coil conductor whereby, upon application of the covering insulation, said member is enabled to serve both as an anchor and seal for said connection.

ROBERT F. SHARROW.

REFERENCES CITED

The following references are of record in the file of this patent:

UNITED STATES PATENTS

| Number | Name | Date |
| --- | --- | --- |
| 1,164,113 | Orswell | Dec. 14, 1915 |
| 1,979,756 | McNamee et al. | Nov. 6, 1934 |
| 2,125,431 | Dinion | Aug. 2, 1938 |
| 2,159,269 | Hasse | May 23, 1939 |
| 2,191,544 | Ruskin | Feb. 27, 1940 |
| 2,243,553 | D'Entremont | May 27, 1941 |
| 2,267,630 | Weiland | Dec. 23, 1941 |
| 2,391,409 | Geist et al. | Dec. 25, 1945 |

FOREIGN PATENTS

| Number | Country | Date |
| --- | --- | --- |
| 530,297 | Great Britain | Dec. 9, 1940 |